(12) United States Patent
Jojic et al.

(10) Patent No.: US 6,785,419 B1
(45) Date of Patent: Aug. 31, 2004

(54) SYSTEM AND METHOD TO FACILITATE PATTERN RECOGNITION BY DEFORMABLE MATCHING

(75) Inventors: Nebojsa Jojic, Redmond, WA (US); Patrice Simard, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 09/748,564

(22) Filed: Dec. 22, 2000

(51) Int. Cl.[7] .............................................. G06K 9/48
(52) U.S. Cl. ................... 382/197; 382/215; 382/219; 382/220; 382/251; 707/6
(58) Field of Search .................. 382/106, 190–197, 382/207, 209, 215–220, 276–280, 160, 224–225, 248–253

(56) References Cited

U.S. PATENT DOCUMENTS

| | | | | |
|---|---|---|---|---|
| 5,469,512 A | * | 11/1995 | Fujita et al. | 382/118 |
| 5,504,318 A | * | 4/1996 | Joseph et al. | 235/454 |
| 5,828,769 A | * | 10/1998 | Burns | 382/118 |
| 5,987,154 A | * | 11/1999 | Gibbon et al. | 382/115 |
| 6,144,167 A | * | 11/2000 | Bouwman et al. | 315/209 R |
| 6,243,492 B1 | * | 6/2001 | Kamei | 382/181 |
| 6,256,412 B1 | * | 7/2001 | Miyazawa et al. | 382/216 |
| 6,345,109 B1 | * | 2/2002 | Souma et al. | 382/118 |
| 6,535,640 B1 | * | 3/2003 | Rajagopal et al. | 382/225 |
| 6,546,117 B1 | * | 4/2003 | Sun et al. | 382/103 |
| 6,621,929 B1 | * | 9/2003 | Lai et al. | 382/217 |
| 6,701,016 B1 | * | 3/2004 | Jojic et al. | 382/209 |

\* cited by examiner

*Primary Examiner*—Bhavesh M. Mehta
*Assistant Examiner*—Gregory Desire
(74) *Attorney, Agent, or Firm*—Amin & Turocy, LLP

(57) ABSTRACT

A system and method to facilitate pattern recognition or matching between patterns are disclosed that is substantially invariant to small transformations. A substantially smooth deformation field is applied to a derivative of a first pattern and a resulting deformation component is added to the first pattern to derive a first deformed pattern. An indication of similarity between the first pattern and a second pattern may be determined by minimizing the distance between the first deformed pattern and the second pattern with respect to deformation coefficients associated with each deformed pattern. The foregoing minimization provides a system (e.g., linear) that may be solved with standard methods.

30 Claims, 8 Drawing Sheets

SYSTEM AND METHOD TO FACILITATE PATTERN RECOGNITION BY DEFORMABLE MATCHING

TECHNICAL FIELD

The present invention relates to pattern recognition and, more particularly, to a system and method to facilitate pattern recognition by deformable matching.

BACKGROUND OF THE INVENTION

Pattern recognition systems are employed in various areas of technology to help classify and/or match a test pattern relative to one or more known prototype patterns. Examples of pattern recognition applications include image analysis and classification, handwriting recognition, speech recognition, man and machine diagnostics, industrial inspection, medical imaging, etc.

In a pattern recognition system, it is common to store large amounts of data indicative of prototype patterns and compare them to a given example or unknown input symbol for identification. Several common algorithms may be utilized, such as K-nearest Neighbor (KNN), Parzen windows, and radial basis function (RBF), to compare or measure similarities between patterns. A level of similarity may be determined by generating a distance measure. By way of example, a simple algorithm for comparing two patterns f and g is to compute the Euclidean distance between them, such as may be expressed as:

$$d_E(f, g) = \sqrt{\sum_{x,y} (f(x, y) - g(x, y))^2} = \sqrt{(f - g)^2}$$

where $d_E$ denotes the Euclidean distance between two patterns, and f and g are assumed to be two-dimensional patterns, indexed by x and y. An extension of the Euclidean distance methodology to other dimensions is straightforward.

The usefulness of the Euclidean distance algorithm is limited, however, because if f and g are not perfectly aligned, the Euclidean distance can yield arbitrarily large values. Consider, for instance, a case where g is a translated version of f, that is g(x,y)=f(x+1,y). In this case, the Euclidean distance could yield a very large value, even though f and g may be virtually identical except for a small amount of translation in the x-direction.

One proposed comparison scheme to remedy the aforementioned shortcoming associated with the traditional Euclidean distance approach is to employ a tangent distance, such as is disclosed in U.S. Pat. No. 5,422,961. This comparison scheme is invariant with respect to a selected set of small transformations of the prototypes. The small transformations of interest are expressed by calculating a derivative of the transformed image with respect to the parameter that controls the transformation. The directional derivative is used to generate a computational representation of the transformation of interest. The transformation of interest, which corresponds to a desired invariance, can be efficiently expressed by using tangent vectors constructed relative to the surface of transformation. The tangent distance $d_T$ may be expressed as:

$$d_T(f, g)^2 = \min_{\alpha_f \alpha_g} (f + L_f a_f - g - L_g a_g)^2$$

where $L_f$ and $L_g$ are matrices of tangent vectors for f and g respectively, and $a_f$ and $a_g$ are vectors representing the amount of deformation along the tangent plane. An advantage of tangent distance compared to the traditional Euclidean distance approach is that the tangent distance is less affected by translation than the Euclidean distance because if $L_f$ and $L_g$ contain a linear approximation of the translation transformation, the tangent distance compares the translated version of f and g. The tangent distance concept is explored in greater detail in a paper entitled, "Efficient Pattern Recognition Using a New Transformation Distance," presented by Patrice Y. Simard, Yann LeCun and John Denker, Advances in Neural Information Processing Systems, Eds. Morgan Kaufmann, pp. 50–58, 1993.

A limitation of tangent distance approach, however, is that the transformations to which it is invariant generally must be known a-priori and precisely (e.g., translation, rotation, scaling, etc.). Moreover, tangent distance has no mechanism to specify loose constraints such as small elastic displacements. Such mechanism would be useful because in many cases, such as with speech or image patterns, it is not known which transformations should be used, but it is assumed that the problem exhibit some invariance with respect to small elastic displacements.

A comparison scheme that is invariant to such transformations can operate with greater economy and speed than comparison schemes that require exhaustive sets of prototypes. By way of example, transformations of alphanumeric patterns that are of interest in this regard may include translation, rotation, scaling, hyperbolic deformations, line thickness changes, and gray-level changes. Any desired number of possible invariances can be included in any particular recognition process, provided that such invariances are known a priori, which is not always possible.

Many computer vision and image processing tasks benefit from invariances to spatial deformations in the image. Examples include handwritten character recognition, face recognition and motion estimation in video sequences. When the input images are subjected to possibly large transformations from a known finite set of transformations (e.g., translations in images), it is possible to model the transformations using a discrete latent variable and perform transformation-invariant clustering and dimensionality reduction using Expectation Maximization as in "Topographic transformation as a discrete latent variable" by Jojic and Frey presented at Neural Information Processing Systems (NIPS) 1999. Although this method produces excellent results on practical problems, the amount of computation grows linearly with the total number of possible transformations in the input.

A tangent-based construction of a deformation field may be used to model large deformations in an approximate manner. The tangent approximation can also be included in generative models, such as including linear factor analyzer models and nonlinear generative models. Another approach to modeling small deformations is to jointly cluster the data and learn a locally linear deformation model for each cluster, e.g., using EM in a factor analyzer. With the factor analysis approach, however, a large amount of data is needed to accurately model the deformations. Learning also is susceptible to local optima that might confuse deformed data from one cluster with data from another cluster. That is, some factors tend to "erase" parts of the image and "draw" new parts, instead of just perturbing the image.

SUMMARY OF THE INVENTION

The present invention relates to a system and method to facilitate pattern recognition or matching between patterns. A deformation field is multiplied with a spatial derivative of a first pattern and a resulting deformation component is added to the first pattern to derive a first deformed pattern. The deformation field is generally non-uniform and may be parameterized by a smooth functional basis having associated deformation coefficients. By way of example, the functional basis may correspond to inverse wavelet transforms of varying frequency or resolution defined by the associated deformation coefficients. A minimum distance between the first deformed pattern and a second pattern may be determined by minimizing the distance between the first deformed pattern and the second pattern with respect to the deformation coefficients of the first deformed pattern. Advantageously, the foregoing minimization provides a system (e.g., linear) that may be solved with standard methods, such as quadratic optimization.

In accordance with one aspect of the present invention, the second pattern also may be deformed. A second deformed pattern is obtained by multiplying a second deformation field with a spatial derivative of the second pattern and by adding the resulting deformation component to the second pattern. The second deformation field is generally non-uniform and may be parameterized by a second smooth functional basis having associated deformation coefficients. By way of example, the second functional basis may correspond to inverse wavelet transforms of varying frequency or resolution defined by the associated deformation coefficients. When the second pattern is deformed, the minimum distance between the first and second deformed patterns may be determined by minimizing the distance between the deformed patterns with respect to their associated deformation coefficients. Advantageously, the foregoing is a standard quadratic optimization problem which reduces to solving a linear system of equations One aspect of the present invention provides a method to facilitate pattern recognition between a first pattern and a second pattern. A substantially smooth deformation field having deformation coefficients is applied to the first pattern to deform the first pattern and form a deformation component of the first pattern. The first pattern and the deformation component of the first pattern are aggregated to define a first deformed pattern. A distance between the first deformed pattern and the second pattern is determined as a function of the deformation coefficients for the first pattern.

Another aspect of the present invention provides a method to facilitate pattern recognition between a first pattern and a second pattern. A substantially smooth deformation field having deformation coefficients is applied to deform the first pattern and form a first deformation component. The first deformation component is added to the first pattern to define a first deformed pattern. The deformation coefficients for the first pattern are determined by minimizing a distance between the first deformed pattern and the second pattern. The determined deformation coefficients may then be employed to evaluate a distance between the first deformed pattern and the second pattern.

In accordance with yet another aspect of the present invention, the second pattern also may be deformed by applying a second deformation field to the second pattern to form a second deformation component. The second deformation component is added to the second pattern to define a second deformed pattern. The second deformation field is parameterized by functional basis vectors and deformation coefficients associated with the second pattern. A distance between the first deformed pattern and the second deformed pattern may then be determined as a function of the respective deformation coefficients.

Still another aspect of the present invention provides a system to measure similarity between first and second patterns. The system includes a first deformation system for applying a substantially smooth deformation field to deform the first pattern and provide a first deformation component. An aggregation system aggregates the first deformation component and the first pattern to derive a first deformed pattern. A minimization system is operable to minimize a distance between the first deformed pattern and the second pattern as a function of the deformation field.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

NOTATION

Figure 1:
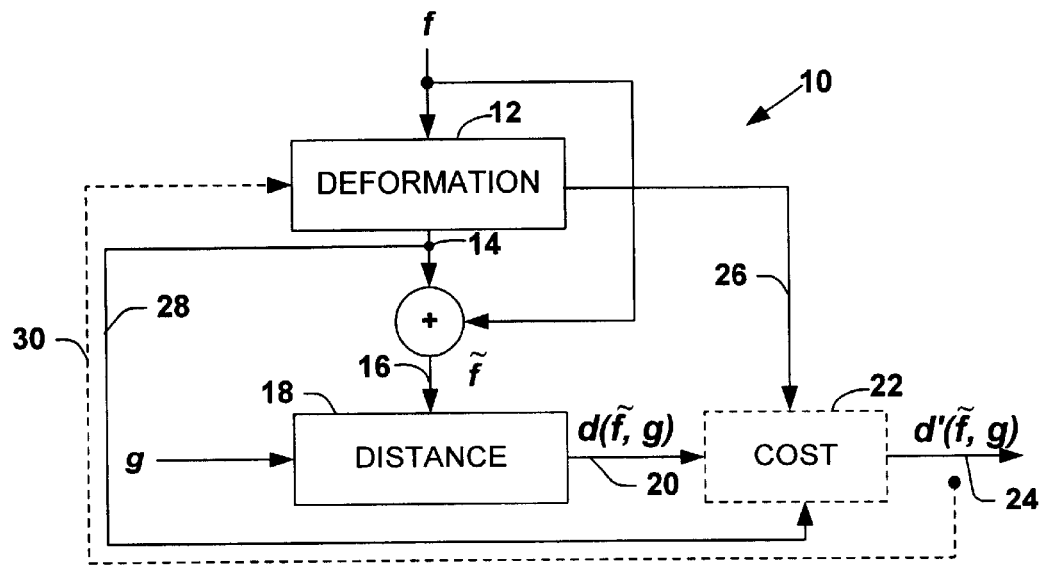
FIG. 1 is a functional block diagram of a system that may be employed to measure similarity between patterns in accordance with the present invention.

The present system can be used for patterns of arbitrary dimensionality that exhibit some type of spatial coherence during deformation. In other words, it is believed that the inherent dimensionality of the deformation is substantially smaller than that of a pattern, due to the fact that the deformation cannot change considerably among the neighboring parts of the pattern. In case of images, for example, if the part in a lower right corner is compressed, it is not likely that the part right above it will be considerably expanded. The deformations in images are usually smooth. Having said that, it also should be noted that regardless of the dimensionality of the pattern, the notation is considerably simplified if the patterns are represented as vectors of values. In case of M×N images, for example, which are inherently two-dimensional, the images can be unwrapped into a long vector by stacking M-long image columns on top of each other (in fact, this is how the matrices of any dimensionality are typically stored in memory). This will result in a vector with M*N elements. We will denote the pattern vectors with bold face lower case letters, such as f and g. By way of illustration, in case of images, the number of elements in these vectors will be equal to the total number of pixels in the image, and in case of speech/audio patterns, the number of elements will be equal to the number of samples or frames in the time window. This simplification in notation allows describing operators acting on patterns of arbitrary dimensionality to be characterized by two-dimensional matrices and the use of simple linear algebra for derivations.

For example, in case of an image pattern f, an approximate derivative in Y direction could be the matrix $$G_y = \begin{matrix} 1 & 2 & 3... & & M & M+1 & ... & MN & \\ 1 & -1 & 0 & 0 & 0...0 & 0 & 0 & 0...0 & 1 \\ 0 & 1 & -1 & 0 & 0...0 & 0 & 0 & 0...0 & 2 \\ ... & & & & & & & & ... \\ 0 & 0 & 0 & 0 & 0...0 & 1 & -1 & 0...0 & M+1 \\ ... & & & & & & & & \\ 0 & 0 & ... & & & & & 1 & MN \end{matrix}$$

The letters in the first row denote the column and the letters in the last column denote the rows of the matrix. In this example, the derivative is approximated by a difference between the pixel and its immediate neighbor. This is accomplished by placing 1 and −1 in the appropriate places in each row. Since the image is represented as a long vector, care has to be taken at the M-th row of G since the appropriate pixel does not have the neighbor (edge of the image). Then a spatial derivative can be computed by multiplying the pattern f with the matrix $G_x$.

When we take the derivative in the other direction, however, 1 and −1 values have to be M entries apart since the neighbor in x direction is in the next column of an image, which is equivalent to being M entries apart in the vector representation:

$$G_y = \begin{matrix} 1 & 2 & 3... & & M & M+1 & ... & MN & \\ 1 & 0 & 0 & 0 & 0...0 & -1 & 0 & 0...0 & 1 \\ 0 & 1 & 0 & 0 & 0...0 & 0 & -1 & 0...0 & 2 \\ ... & & & & & & & & ... \\ 0 & 0 & ... & & & & & 1 & MN \end{matrix}$$

Note, however, that other derivative approximations can be described in similar way. It is to be understood and appreciated that the above matrices have been provided for purposes of illustration only, and the scope of this application is not limited to these particular approximations. Those skilled in the art will understand and appreciate that other approximations could be utilized in accordance with an aspect of the present invention.

This illustrates that vector representation of the patterns allows linear operations, even when they deal with different dimensions of the pattern, to be expressed by matrix multiplications and thus all variables in our notation are at most two-dimensional.

To make it easier to track the dimensionality of different terms in equations presented in the following description, lower case letters represent scalars (distance d, for example), bold-face lower-case letters represent vectors (such as a pattern f, or a vector of deformation coefficients a) and bold-face capital letters represent matrices, such as the above difference operators $G_x$, and $G_y$.

DETAILED DESCRIPTION OF THE INVENTION

The present invention provides a new model that may be utilized to measure similarity between patterns to facilitate pattern recognition or matching. The present invention employs a deformation field that is a linear combination of functional basis vectors one or more patterns. The functional basis vectors may be represented as low frequency basis vectors, such as low-frequency wavelet basis vectors, which allow significantly fewer parameters to represent a wide range of realistic smooth deformations. In this way, a pattern recognition system, in accordance with the present invention, is less likely to use a deformation field to "erase" part of an image or "draw" a new part, because the field is usually not smooth.

In the following description, for purposes of explanation, certain details are set forth in order to provide a thorough understanding of the present invention. It will be evident to one skilled in the art, however, that the present invention may be practiced without these specific details. In other instances, well-known structures and functional aspects are shown and described in block diagram form in order to facilitate description of the present invention. Those skilled in the art will understand and appreciate various ways to implement such examples, all of which are contemplated as being within the scope of the present invention.

Turning now to FIG. 1, a functional block diagram of a system 10 to facilitate matching or recognizing patterns f and g, in accordance with an aspect of the present invention is, illustrated. The pattern recognition system 10 includes a deformation system 12 operable to deform the pattern f to derive a deformation component 14 thereof. The deformation component 14 is aggregated with the original pattern f to form a deformed version 16 of the pattern, indicated at f̂.

The deformation system 12, for example, applies a smooth, non-uniform deformation field to a spatial derivative of the pattern f. The deformation field may be parameterized by smooth, functional basis vectors and associated deformation coefficients. The extent of the deformation coefficients determines the localization of the deformation being applied to the pattern f. That is, a larger number of coefficients may be utilized to implement more localized deformation of the pattern.

By way of example, the functional basis vectors may correspond to inverse wavelet transforms of varying frequency or resolution defined by the associated deformation coefficients. Computing low frequency wavelet coefficients only, with all the higher frequency coefficients set to zero, may be utilized to mitigate computational processing associated with the recognition (or matching) process.

The system 10 also includes a distance determining system 18 for deriving an indication of the distance 20 between the deformed pattern 16 and the other pattern g. By way of example, the pattern f may be a test pattern while the pattern g may be prototype pattern or vice versa. The distance between the deformed pattern f̂ and the pattern g thus may be determined by subtracting the pattern g from the deformed pattern f̂ (e.g., d(f,g)=‖f̂−g‖).

The system 10 also may include a cost function 22 that is applied to the distance 20 to impose a cost (or penalty) and provide a weighted indication of the distance d?(f,g), indicated at 24. The cost function 22, for example, may impose a cost that is functionally related to the deformation coefficients (indicated by connection 26), such that, for example, higher resolution deformations have a greater associated cost than low resolution deformations. Alternatively or additionally, a cost may be computed based on pattern g and/or the deformation component 14 (indicated by connection 28) of the pattern f.

When the deformation coefficients are unknown, they may be computed as a function of the distance d?(f̂,g) provided at 24 (or alternatively from the distance 20). That is, corresponding deformation coefficients, for example, may be determined by minimizing ‖f̂−g‖ with respect to the deformation coefficients provided by the deformation function 12. Another option is to compute the deformation coefficients in an iterative manner (e.g., by gradient descent), such as based on feedback 30 from the weighted distance 24 (or alternatively from the distance 20) to the deformation function 12.

Figure 2:
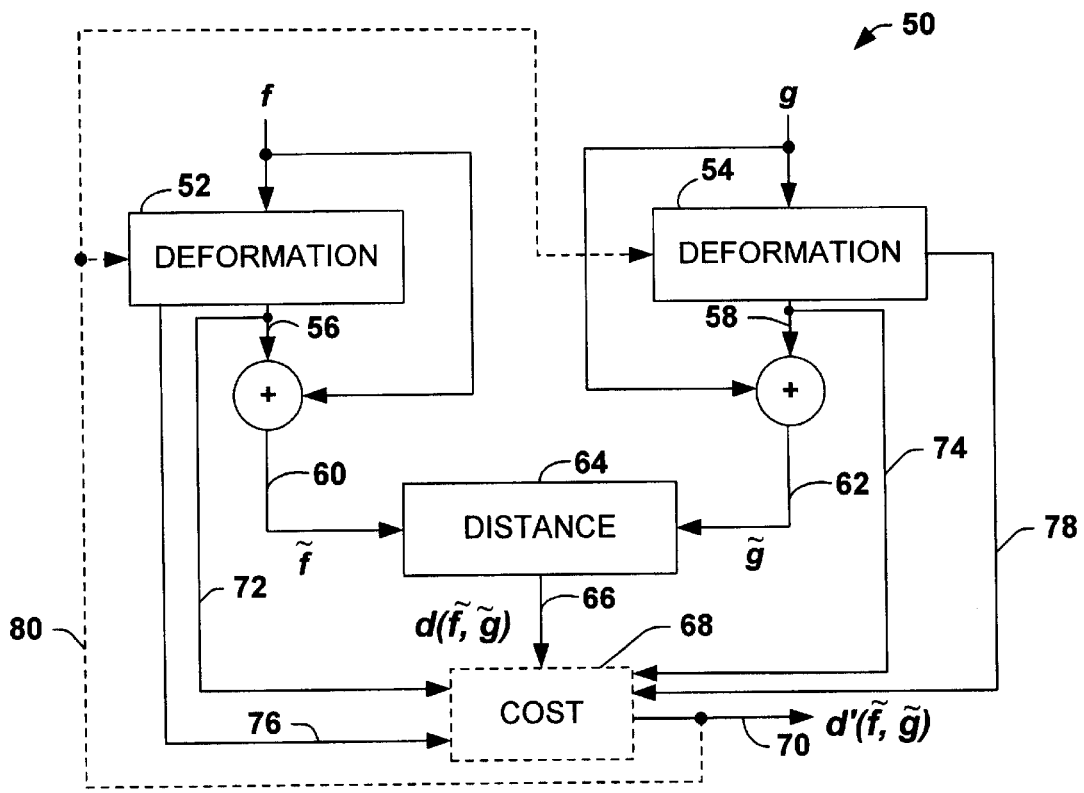
FIG. 2 is a functional block diagram of another system that may be employed to measure similarity between patterns in accordance with the present invention.

FIG. 2 illustrates another example of a system 50 that may be utilized to measure the similarity between patterns f and g in accordance with an aspect of the present invention. In the system 50, both input patterns f and g are deformed. More particularly, deformation functions 52 and 54 are employed to derive a deformation component for the respective patterns f and g, indicated respectively at 56 and 58. The deformation components 56 and 58 are added to the respective, non-deformed patterns f and g to derive corresponding deformed patterns, indicated respectively at 60 and 62.

The respective deformation components 56 and 58 may be derived by applying a deformation field having associated deformation coefficients to a derivative of each respective pattern. For example, if the patterns are images in pixel space, and each of them can be deformed by a deformation field parameterized by X and Y coefficients, respectively, the two deformation components 56 and 58 can be obtained by multiplying those fields with the spatial derivatives of each of the patterns f and g. Those skilled in the art will understand and appreciate that the patterns f and g may correspond to other types of patterns (e.g., speech patterns, celestial patterns, stock market information, etc.) in a corresponding dimensional space.

Each deformation field may be parameterized by functional basis vectors and associated deformation coefficients. The functional basis vectors may be derived from an inverse wavelet transform, a fast Fourier transform, or other suitable transform (e.g., sin or cosine) operable to provide a substantially smooth deformation field. An inverse wavelet transform is particularly desirable, as it may be utilized to characterize the deformation field with low frequency wavelets and associated deformation coefficients. The deformation coefficients may be selected to capture global trends in the pattern(s) being recognized, such as using only the coefficient corresponding to very smooth deformation. Alternatively, a greater number of coefficients may be utilized to capture more localized deformations.

By way of illustration, even though all deformation fields can be represented with the full set of wavelet coefficients, a useful subset of fields (e.g., the substantially smooth deformation fields) can be represented with a small subset of the available coefficients. A deformed image could be obtained by applying the deformation field directly to the image, but this would be quite complicated because one or more points likely would not land on an associated sampling grid, and because such operation is not linear.

In order to facilitate the computations associated with forming the deformed image, a linear approximation of the deformation (represented by the deformation field) is made. The deformed image may then be obtained by multiplying the deformation field with a spatial derivative of the image, and adding the result to the original image. An added advantage of the linear approximation is that the deformation coefficients can be found by solving a linear system. A distance determining system 64 is employed to derive a distance 66 between the deformed patterns f̂ and g̃, such as d?f,g)=‖f̂−g̃‖. The distance 66 provides a quantitative indication as to whether there is a match between the patterns f and g.

The system 50 further may include a cost function 68 for imposing a cost and/or weighting different aspects of the distance 66 or part of the system utilized to derive the distance 66. The cost function 68 provides a modified measure of the distance between the patterns, indicated at 70, which reflects the cost imposed thereon. The cost function 68, for example, may include a variant structure associated with the deformation components 56 and 58 (indicated by connections 72 and 74). Additionally or alternatively, the cost may include a covariant structure functionally related to the deformation coefficients of each corresponding deformation system 52 and 54 (indicated by connections 76 and 78) and/or functionally related to the computed distance at 66.

In a situation where the deformation coefficients are unknown, they may be computed by solving a linear system defined by the distance 66 or 70 between the deformed images. By way of example, the minimization may include determining the minimum of ‖f̂−g̃‖ with respect to the deformation coefficients associated with the deformed patterns. Advantageously, this may be solved by straightforward methods, such as quadratic optimization. Alternatively, feedback 80 may be utilized as part of an iterative process (e.g., gradient descent) to compute the respective deformation coefficients associated with each deformation function 52 and 54.

In accordance with an aspect of the present invention, the deformation coefficients of the first pattern may be tied to the deformation coefficient of the second pattern. For instance, assuming that both patterns f and g have identical displacement basis functions, the deformation coefficients of the first pattern may be set to be the opposite of the deformation coefficient of the second pattern, thus reducing the size of the optimization problem and further constraining the allowable deformations.

Figure 3:
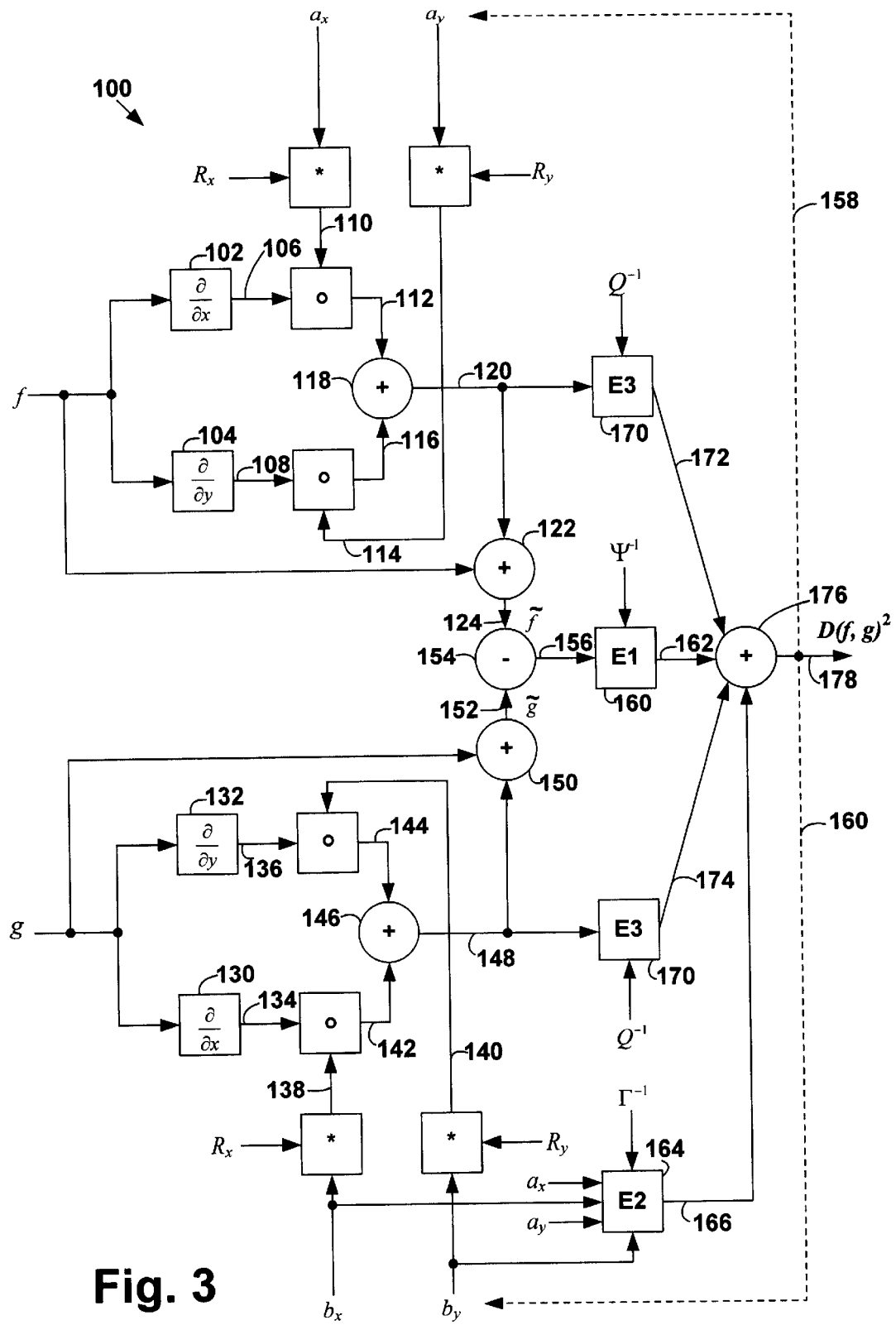
FIG. 3 is a functional block diagram of yet another system that may be employed to measure similarity between patterns in accordance with the present invention.

FIG. 3 is a functional block diagram of a system 100 that may be employed, in accordance with an aspect of the present invention, to measure the similarity between two patterns f and g. For purposes of simplicity of explanation, the patterns f and g will be described as being digital images, although it is to be understood and appreciated that the system 100 is equally applicable to other types of patterns. Those skilled in the art also will understand and appreciate that the principles described below may be extended to numerous applications, such as video coding, motion estimation, optical character recognition and video mosaic, to name a few.

The image f is supplied to derivative functions 102 and 104, which perform partial derivatives on the image f to provide respective spatial derivatives of the image with respect to x and y, indicated respectively at 106 and 108.

An x-component of a deformation field 110 is applied, such as by an element-wise product function to the partial derivative 106 with respect to x to derive a corresponding deformation component 112 of the image with respect to x. Similarly, a y-component of a deformation field 114 is applied to the partial derivative 108, with respect to y, via an element-wise product function to derive a deformation component 116 of the image f. The deformation field $(d_x, d_y)$, which is the aggregate of the field components 110 and 114, may be a non-uniform field that is parameterized by a smooth functional basis having associated deformation coefficients. The functional basis may be in the form of vectors derived from, for example, an inverse wavelet transform, a fast Fourier transform, or other suitable transform (e.g., sin or cosine) operable to provide a substantially smooth deformation field. The resulting deformation components 112 and 116 of the image f are added together by a summing function 118 to form an aggregated deformation component 120 for the image f. The resulting deformation component 120 is, in turn, added to the image f by a summing function 122 to derive a deformed image $\tilde{f}$, indicated at 124. The deformed image $\tilde{f}$ thus may be represented as $$\tilde{f} = f + \frac{\partial f}{\partial x} \circ \delta_x + \frac{\partial f}{\partial y} \circ \delta_y, \quad \text{(Eq. 1)}$$

where "·" denotes element-wise multiplication, sometimes in mathematical software denoted by ".*".

In accordance with an aspect of the present invention, the deformation field $(d_x, d_y)$ is a substantially smooth deformation field is constructed from low frequency wavelets basis vectors stored as columns in matrix R. For example, an x-component $R_x$ of a wavelet basis vector is multiplied by associated deformation coefficients $a_x$ to form the deformation field component 110 and a y-component $R_y$ of the wavelet basis vector is multiplied by deformation coefficients $a_y$ to form the deformation field component 114. As a result, the deformation field may be expressed in its component parts as $$d_x = R_x a_x,$$
$$d_y = R_y a_y, \quad \text{(Eq. 2)}$$

where the columns of R contain low-frequency wavelet basis vectors $(R_x, R_y)$, and $$a = \begin{bmatrix} a_x \\ a_y \end{bmatrix}$$

are the deformation coefficients. It should be noted, that the number of basis functions is considerably smaller than the dimensionality of the vector describing the pattern (the total number of pixels in the image), and thus the deformation field, which consists of as many values as the pattern, may be described by a considerably smaller number of deformation coefficients The number of parameters in $a_x$ and $a_y$ can be determined a priori, or by trial and error.

An advantage of wavelets is their space/frequency localization. For example, low-frequency deformation coefficients may be selected to capture global trends in the pattern(s) being recognized, such as by utilizing a number of deformation coefficients that is a small fraction of the number of pixels in the image f. The deformations localized in smaller regions of the image can be expressed by more spatially localized (e.g., higher frequency) wavelets. As a result, the deformed image $\tilde{f}$ may be represented as a linear approximation, which mitigates computation time, namely:

$$\tilde{f} = f + (G_x f) \cdot (R a_x) + (G_y f) \cdot (R a_y), \quad \text{(Eq. 3)}$$

where the derivatives in Eq. 1 are approximated by sparse matrices $G_x$ and $G_y$ that operate on f to compute finite spatial differences in the image pattern.

It is to be appreciated that the deformation field components 110, 114 is decoupled from the image f. That is, the deformation component is decomposed along its basis of displacement and, thus, the deformed image may be approximated by a linear transformation, as indicated in Eq. 3. As a result, a particular deformation field may be easily applied to other patterns to deform the pattern in a corresponding way.

It is also to be appreciated that Eq. 3 is bilinear in the deformation coefficients $(a_x, a_y)$ and in the original image f. That is, Eq. 3 is linear in f given a and it is linear in a given f. The element-wise product thus may be rewritten as a matrix product, such as by converting either the vector Gf or the vector Ra to a diagonal matrix using a diag ( ) function:

$$\tilde{f} = f + D(f)a, \text{ where } D(f) = [\text{diag}(G_x f)R_x \; \text{diag}(G_y f)R_y] \quad \text{(Eq. 4)}$$

$$\tilde{f} = T(a)f, \text{ where } T(a) = [I + \text{diag}(R_x a_x)G_x + \text{diag}(R_y a_y)G_y]. \quad \text{(Eq. 5)}$$

Eq. 4 seems like a typical linear model such as factor analysis or principal component analysis. It should be noted, however, that the components in this case need not to be estimated, as they are based on the deformation model D(f).

Eq. 4 shows by applying a simple pseudo inverse, the deformation coefficients that transform f into $\tilde{f}$ may be estimated:

$$a = D(f)^{-1}(\tilde{f} - f). \quad \text{(Eq. 6)}$$

The low-dimensional vector of coefficients provided by Eq. 6 minimizes the distance $\|f - \tilde{f}\|$.

Given a test (or prototype) image g, the image f may be matched relative to g by computing the deformation coefficients, $a = D(f)^{-1}(g - f)$, that minimize $\|f - g\|$. In accordance with another aspect of the present invention the image g, which may be an N-dimensional vector of a digital image in the same space as the image f, also may be deformed. This enables more extreme deformations to be successfully matched in accordance with the present invention.

Returning now to FIG. 3, the deformation of the image g may occur in substantially the same manner as described above with respect to the image f. Briefly stated, the image g is supplied to partial derivative functions 130 and 132, which perform partial derivatives on the image g to provide partial derivatives 134 and 136 of the image with respect to x and y, respectively. A deformation field $(d_x, d_y)$, is parameterized by a smooth functional basis having functional basis vector components $R_x$ and $R_y$ and associated deformation coefficients $b_x$ and $b_y$, and By way of example, the deformation field is a substantially smooth deformation field constructed from low frequency wavelets. Deformation coefficients $b_x$ and $b_y$ are multiplied by wavelet basis vectors $R_x$ and $R_y$ to form x and y-components 138 and 140 of the deformation field, which may be expressed as $$d_x = R_x b_x,$$

$$d_y = R_y b_y, \quad \text{(Eq. 7)}$$

where $(R_x, R_y)$ are the wavelet basis vectors, and $$b = \begin{bmatrix} b_x \\ b_y \end{bmatrix}$$

are the deformation coefficients.

It is appreciated that it may be desirable in many applications, to make $R_x$ and $R_y$ the same for the two patterns f and g, e.g. $R_x = R_y = R$.

The resulting deformation field component vectors 138 and 140 are applied to the partial derivatives 134 and 136 of the image (e.g., via an element-wise product function) to provide a deformation component 142 of the image with respect to x and a deformation component 144 of the image g with respect to y. The resulting components 142 and 144 are aggregated by a summing function 146 to derive a deformation component 148 of the image g. The deformation component 148 is added to the image g by a summing function 150 to derive a deformed image $\tilde{g}$, indicated at 152. The deformed image 152 thus may be represented as $$\tilde{g} = g + (G_x g) \cdot (R b_x) + (G_y g) \cdot (R b_y), \quad \text{(Eq. 8)}$$

where $G_x$ and $G_y$ are approximate spatial derivative matrices used in derivative functions 130 and 132 (see also the Notation section).

As described above with respect to Eq. 4, the deformed image $\tilde{g}$ may in turn be represented as:

$$\tilde{g} = g + D(g) b, \text{ where } D(g) = [\text{diag}(G_x g) R \; \text{diag}(G_y g) R] \quad \text{(Eq. 9)}$$

In accordance with an aspect of the present invention, the deformed image $\tilde{g}$ may be subtracted from the deformed image $\tilde{f}$ by a subtraction function 154 to provide a measure of the distance 156 between the two deformed images. From Equations 4 and 9, the distance between the two deformed images $\tilde{f}$ and $\tilde{g}$ may be expressed as $$\tilde{f} - \tilde{g} = f - g + [D(f) - D(g)] \begin{bmatrix} a \\ b \end{bmatrix}, \quad \text{(Eq. 10)}$$

Eq. 10 provides a good indication of the similarity between the images f and g provided that the deformation coefficients a and b are known. Those skilled in the art will understand and appreciate that the deformation coefficients a and b may be found so as to minimize the difference in Eq. 10 in a straightforward fashion, such as by quadratic optimization with respect to the deformation coefficients a and b. Alternatively, an iterative process, such as gradient descent, may be employed to derive the deformation coefficients. For example, feedback 158 and 160 indicative of the distance measure 156 may be applied to iteratively derive the respective coefficients a and b.

In accordance with an aspect of the present invention, the deformation coefficients a and b may be functionally related to each other. By way of illustration, assuming that both patterns have identical displacement basis functions, the deformation coefficients of the image f may be set to be substantially the opposite of the deformation coefficient of the image g (e.g., a=–b). By placing such a requirement on the deformation coefficients, it will be appreciated that the images f and g will tend to deform toward each other, tending to minimize the distance between the resulting deformed images $\tilde{f}$ and $\tilde{g}$. In addition, the size of the optimization problem may be reduced and the allowable deformations may be further constrained.

In accordance with an aspect of the present invention, one or more cost functions may be employed to capture correlations between different pixels in the respective images f and g and/or to favor some deformation fields over others. Referring back to the example of FIG. 3, a cost function (E1) 160 may be applied to the distance 156 between the deformed images to derive a first term 162 that provides a weighted approximate measure of similarity between the images f and g. The cost function 160, for example, returns a scalar quantity functionally related to the distance 156 and a cost descriptor $\Psi$. By way of example, $\Psi$ is a diagonal matrix whose non-zero elements contain variances of appropriate pixels to enable different pixels to have different levels of importance for purposes of matching. The diagonal matrix $\Psi$ may be hand crafted to non-uniformly weight the importance of each pixel so that more important aspects of a pattern may be weighted more heavily in the pattern recognition process.

For example, if the images f and g are images of a tree in the wind, the deformation coefficients should be capable of aligning the main portions of the image, such as may include the trunk and large branches, while the variability in the appearance of the leaves may be captured in the cost term $\Psi$.

The system 100 may include another cost function (E2) 164 to capture a covariance structure of the deformation coefficients a and b of the allowed deformations. The cost term 164 applies a covariant matrix G to the deformation coefficients a and b to constrain the deformation of the images f and g. The cost function. 164 provides scalar cost quantity 166, which is functionally related to the matrix G and the respective deformation coefficients a and b (e.g., a and b are inputs to 164). The cost term 166 (see, e.g., Eq. 11) allows capturing correlations among coefficients. For instance, if the major component of a deformation is a rotation around the center, then the displacements in x and y directions are strongly correlated. Similarly, when deforming both images, it is likely that the deformation coefficients for the two images are anti-correlated, e.g., one is deforming in the opposite direction of the other, so that minimal deformation is necessary in both images.

Those familiar with statistics and covariance matrices can easily construct matrices that produce cost terms that are lower when these types of correlations are present in the deformation coefficients. While, in theory, similar correlations can be captured directly in the pixel domain, such as in the cost term involving $\Psi$, in practice it is difficult to incorporate such correlations due to the high dimensionality of the data. Consequently, it is easier to use a diagonal matrix that decouples the effects of different pixels in the appropriate cost term. In contrast, the number of deformation coefficients in vectors a and b are small enough to make it possible to use non-diagonal structures that capture correlations as discussed herein.

Figure 4:
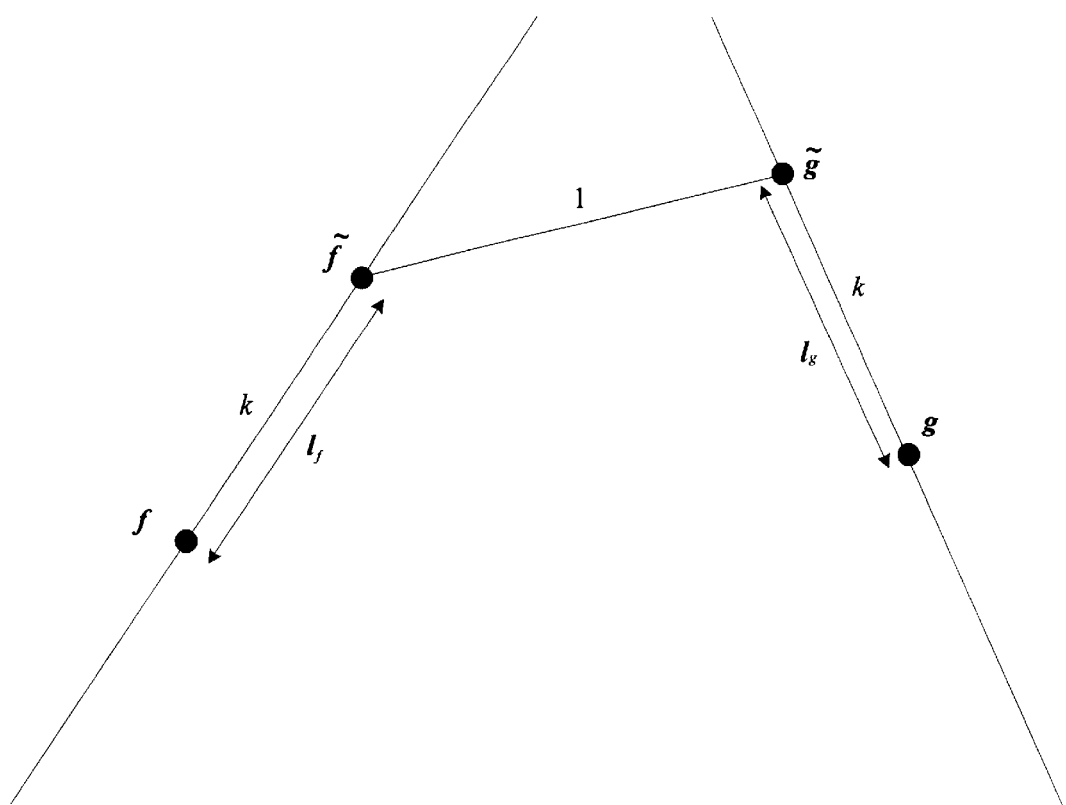
FIG. 4 is a graphical depiction of a relationship of two patterns being deformably matched in accordance with the present invention.

Another cost function (E3) 170 may be applied to the respective deformation components 120 and 148 to further constrain the elastic deformation associated with each of the deformation coefficients a and b. For example, a constraint matrix Q also is applied to the cost function 170 to return a scalar quantities 172 and 174 functionally related to the respective deformation components 120 and 148 and to the matrix Q. The matrix Q captures a global cost of deformation in the pixel space (as opposed to G which capture a deformation cost in the wavelet space). For example, a good choice for Q would be a matrix co-linear to $\Psi$ and the scalar ratio between the two matrices would reflect the cost of moving $\tilde{f}$ and $\tilde{g}$ in the tangent planes, with respect to the cost of the distance between $\tilde{f}$ and $\tilde{g}$, such as depicted in FIG. 4, with Q=kΨ.

The cost quantities 162, 166, 168, 172, and 174 are aggregated together by a summing function 176 to derive a versatile image distance 178 indicative of a measure of the similarity between the images f and g (e.g., the distance there between), which may be expressed as $$d(f,g)^2 = \min_{a,b}\left\{(\tilde{f}-\tilde{g})'\Psi^{-1}(\tilde{f}-\tilde{g})+[a'b']?^{-1}\begin{bmatrix}a\\b\end{bmatrix}+ \right.$$
$$\left. (D(f)a)'Q^{-1}(D(f)a)+(D(f)b)'Q^{-1}(D(f)b)\right\}.$$ 
(Eq. 11)

Those skilled in the art will understand and appreciate that Eq. 11 is quadratic in the deformation coefficients a and b, which, as mentioned above, enables the coefficients to be determined by straightforward methods when such cost terms are employed.

It thus may be shown that d(f,g) may be computed by solving a linear system, in which (a,b) are the unknown parameters, and e(a,b) is the quantity to be minimized. Since d(f,g) is at a minimum, $$\frac{\partial e(a,b)}{\partial a_x}=0, \frac{\partial e(a,b)}{\partial a_y}=0, \frac{\partial e(a,b)}{\partial b_x}=0,$$

and $$\frac{\partial e(a,b)}{\partial b_y}=0.$$

Because e(a,b) is quadratic in a and b, setting its derivative to 0 results in a linear system that can be solved with standard methods.

It is to be understood and appreciated that other methods may be employed to solve for the deformation coefficients a and b. For example, as indicated in FIG. 3, the versatile image distance may be fed back as part of a feedback loop that may be utilized to derive the deformation coefficients as part of an iterative process, in which the coefficients are further refined with each iteration. The iterative process may be considered more manageable in certain circumstances, such as when the linear system becomes too large to solve directly.

FIG. 4 is a graphical representation of patterns f and g and their respective deformed patterns $\tilde{f}$ and $\tilde{g}$, illustrating the relationship between the patterns in accordance with an aspect of the present invention. In this example, the elastic distance between the patterns f and g is modeled according to a spring system with an assumption that $?^{-1}=0$ in Eq. 11, that Ψ is the identity, and that Q=kΨ. That is, each of the respective deformed patterns $\tilde{f}$ and $\tilde{g}$ is able to move along a linear plane, but they are attached to each other by a spring of constant elasticity (e.g., an elasticity of 1) and by springs of elasticity k to their respective patterns f and g. That is, the deformed pattern $\tilde{f}$ is functionally related to the pattern f by a spring constant k and is free to move along a linear plane relative to the pattern f. The movement along the linear plane for f may be expressed as $$l_f=D(f)a \quad (Eq. 14)$$

Similarly, the point the deformed pattern $\tilde{g}$ is free to move along its linear plane relative to the pattern g, as may be expressed as $$l_g=D(g)b \quad (Eq. 15)$$

At equilibrium, the energy of the system of FIG. 4 may be expressed as $$d(f,g)^2=k(l_f^2+l_g^2)+(\tilde{f}-\tilde{g})^2 \quad (Eq. 16)$$

It is to be appreciated that if $?^{-1}$ ?0, certain dimensions may be privileged within each linear space.

In FIG. 4, for purposes of simplicity of explanation, the linear space has one dimension, or only one direction. It is to be understood and appreciated that a system may be implemented in accordance with an aspect of the present invention having multiple dimensions, each of which may be privileged by configuring an appropriate weighting matrix $?^{-1}$.

Figure 5:
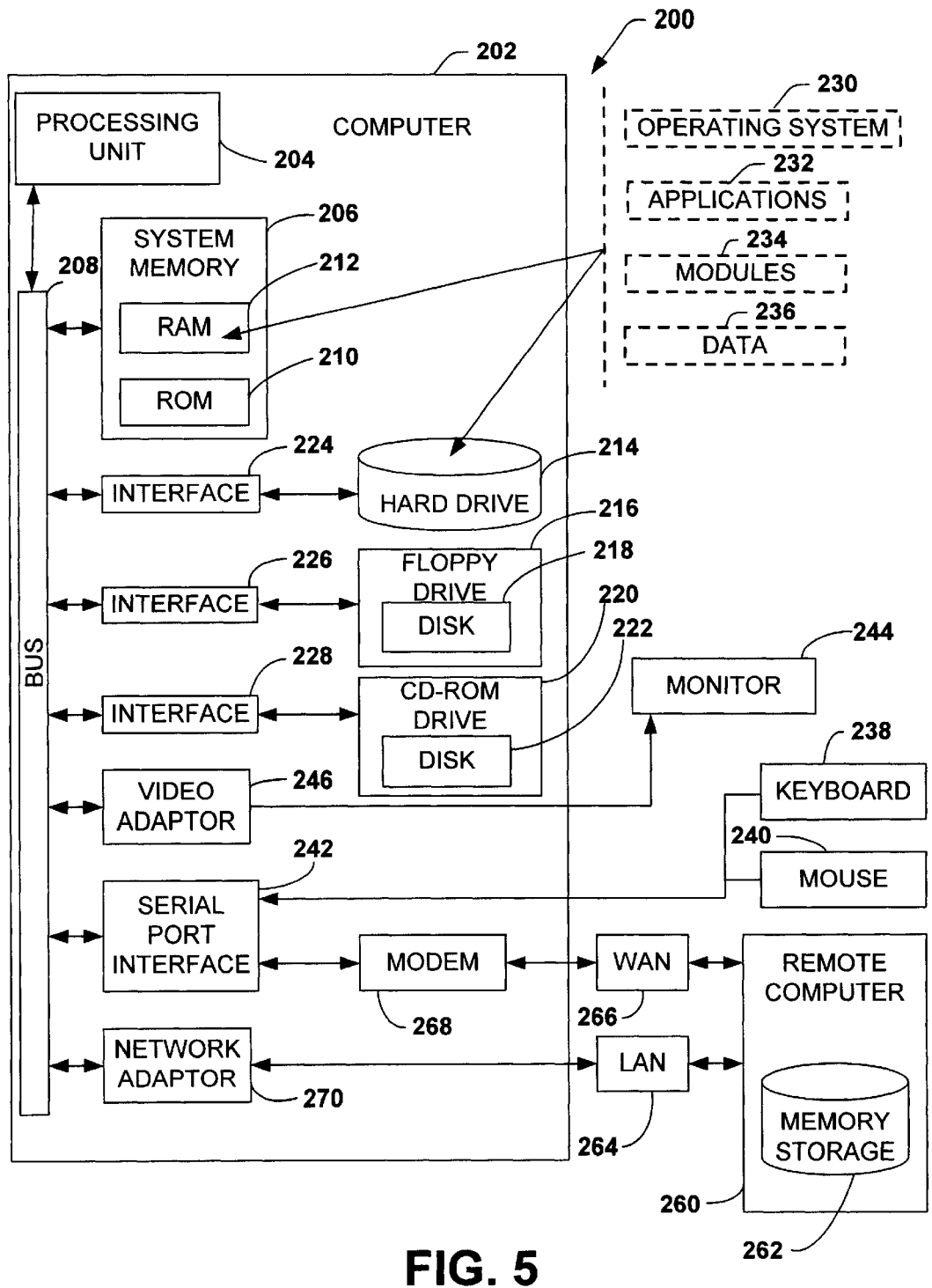
FIG. 5 is a functional block diagram of an operating environment that may be employed to implement a process in accordance with the present invention.

In order to provide additional context for the various aspects of the present invention, FIG. 5 and the following discussion are intended to provide a brief, general description of a suitable computing environment 200 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in both local and remote memory storage devices.

With reference to FIG. 5, an exemplary system environment 200 for implementing the various aspects of the invention includes a conventional computer 202, including a processing unit 204, a system memory 206, and a system bus 208 that couples various system components including the system memory to the processing unit 204. The processing unit 204 may be any of various commercially available processors. Dual microprocessors and other multi-processor architectures also may be used as the processing unit 204.

The system bus 208 may be any of several types of bus structure including a memory bus or memory controller, a peripheral bus, and a local bus using any of a variety of conventional bus architectures such as PCI, VESA, Microchannel, ISA, and EISA, to name a few. The system memory includes read only memory (ROM) 210 and random access memory (RAM) 212. A basic input/output system (BIOS), containing the basic routines that help to transfer information between elements within the computer 20, such as during start-up, is stored in ROM 210.

The computer 20 also may include, for example, a hard disk drive 214, a magnetic disk drive 216, e.g., to read from or write to a removable disk 218, and an optical disk drive 220, e.g., for reading a CD-ROM disk 222 or to read from or write to other optical media. The hard disk drive 214, magnetic disk drive 216, and optical disk drive 220 are connected to the system bus 208 by a hard disk drive interface 224, a magnetic disk drive interface 226, and an optical drive interface 228, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment 200, and further that any such media may contain computer-executable instructions for performing the methods of the present invention and string pattern-related data.

A number of program modules may be stored in the drives and RAM 212, including an operating system 230, one or more application programs 232, other program modules 234, and program data 236. The operating system 230 in the illustrated with any operating system or combinations of operating systems.

A user may enter commands and information into the computer 202 through one or more user input devices, such as a keyboard 238 and a pointing device (e.g., a mouse 240). Other input devices (not shown) may include a microphone, a joystick, a game pad, a satellite dish, a scanner, or the like. These and other input devices are often connected to the processing unit 204 through a serial port interface 242 that is coupled to the system bus 208, but may be connected by other interfaces, such as a parallel port, a game port or a universal serial bus (USB). A monitor 244 or other type of display device is also connected to the system bus 208 via an interface, such as a video adapter 246. In addition to the monitor, a computer typically includes other peripheral output devices (not shown), such as speakers, printers etc.

The computer 202 may operate in a networked environment using logical connections to one or more remote computers, such as a remote computer 260. The remote computer 260 may be a workstation, a server computer, a router, a peer device or other common network node, and typically includes many or all of the elements described relative to the computer 202, although, for purposes of brevity, only a memory storage device 262 is illustrated in FIG. 5. The logical connections depicted in FIG. 5 include a local area network (LAN) 264 and a wide area network (WAN) 266. Such networking environments are commonplace in offices, enterprise-wide computer networks, intranets and the Internet.

When used in a LAN networking environment, the computer 202 is connected to the local network 264 through a network interface or adapter 268. When used in a WAN networking environment, the computer 202 typically includes a modem 266, or is connected to a communications server on the LAN, or has other means for establishing communications over the WAN 266, such as the Internet. The modem 266, which may be internal or external, is connected to the system bus 208 via the serial port interface 242. In a networked environment, program modules depicted relative to the computer 202, or portions thereof, may be stored in the remote memory storage device 262. It will be appreciated that the network connections shown are exemplary and other means of establishing a communications link between the computers 202 and 260 may be used.

In accordance with the practices of persons skilled in the art of computer programming, the present invention has been described with reference to acts and symbolic representations of operations that are performed by a computer, such as the computer 202 or remote computer 260, unless otherwise indicated. Such acts and operations are sometimes referred to as being computer-executed. It will be appreciated that the acts and symbolically represented operations include the manipulation by the processing unit 204 of electrical signals representing data bits which causes a resulting transformation or reduction of the electrical signal representation, and the maintenance of data bits at memory locations in the memory system (including the system memory 206, hard drive 214, floppy disks 218, CD-ROM 222, and shared storage system 210) to thereby reconfigure or otherwise alter the computer system's operation, as well as other processing of signals. The memory locations where such data bits are maintained are physical locations that have particular electrical, magnetic, or optical properties corresponding to the data bits.

Figure 6A:
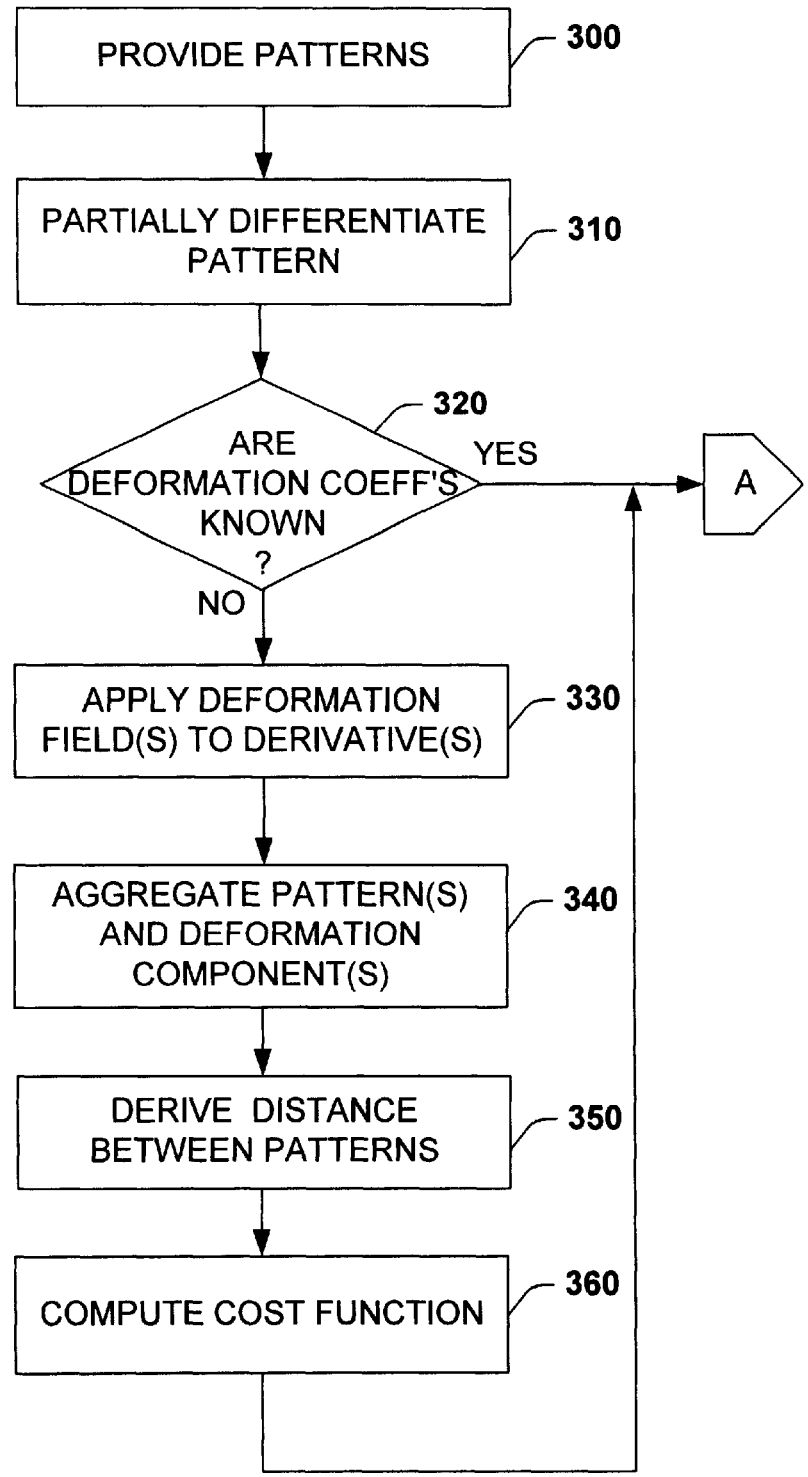
FIG. 6A is a flow diagram illustrating a methodology for determining deformation coefficients in accordance with the present invention.
Figure 6B:
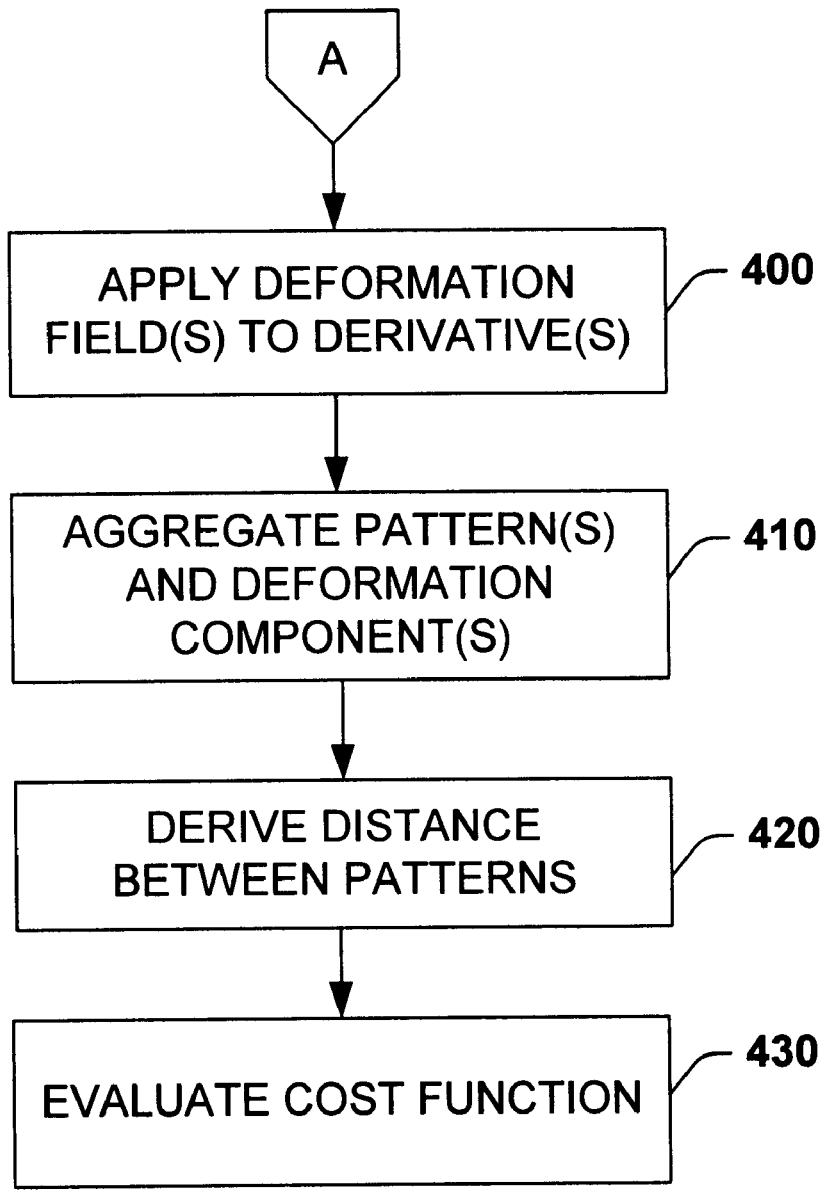
FIG. 6B is a flow diagram illustrating a methodology for deriving a measure of similarity between patterns in accordance with the present invention.

In view of the exemplary operating environments and functional system shown and described above, a methodology, which may be implemented in accordance with the present invention at a computer, will be better appreciated with reference to the flow diagrams of FIGS. 6A and 6B. While, for purposes of explanation, the methodology is shown and described as a series of steps with respect to the flow diagrams, it is to be understood and appreciated that the present invention is not limited by the order of steps, as some steps may, in accordance with the present invention, occur in different orders and/or concurrently with other steps from that shown and described herein. Moreover, not all illustrated steps may be required to implement a methodology in accordance with the present invention.

FIGS. 6A and 6B are flow diagrams respectively illustrating a methodology for determining deformation coefficients and computing a measure of similarity between patterns in accordance with an aspect of the present invention. The methodology begins at step 300 in which patterns f and g are provided for which a matching process, in accordance with the present invention, is to be implemented. The patterns may be any type of patterns, such as, for example, images (e.g., handwriting, alphanumeric characters, finger prints, etc.), audio patterns (speech, marine animal sounds, etc.). The process then proceeds to step 310. Furthermore, the patterns provided at step 300 may be smoothed versions of the original patterns. Smoothing may be necessary in some cases where the data is very noisy because in further steps, derivatives will be computed, and derivative are sensitive to noisy data. For instance, smoothing can be obtained by convolving the original patterns with a Gaussian function of standard deviation $\sigma$.

At step 310, a derivative of each pattern f and/or g being deformed is taken. For example, a spatial derivative may be taken of the pattern f with respect to x and y, such as partial derivatives for each dimension associated with the pattern. At step 320, a determination is made as to whether the deformation coefficients are known. If the coefficients are known, the process proceeds through connector A to FIG. 6B. However, if the deformation coefficients are either not known or it is desirable to refine the coefficients, the process proceeds to step 330.

At step 330, a substantially smooth deformation field is applied to (e.g., multiplied with) the derivative of one or more of the patterns. In accordance with an aspect of the present invention, the deformation field is a smooth and generally non-uniform field parameterized by functional basis vectors and associated deformation coefficients. The functional basis vectors may be linear transformation matrices, such as, for example, wavelet basis vectors, Fourier type basis vectors, sin or cosine vectors, or other suitable basis vectors. The basis vectors are multiplied by the deformation coefficients, such as by employing an element-wise product function. At this stage of the process, the deformation coefficients are unknown parameters and, thus, may be characterized as variables. The deformation field is, in turn applied to the spatial derivative(s) via an element-wise product function to provide a corresponding deformation component for each pattern being deformed. As mentioned above, it may not be necessary to deform both patterns.

From step 330, the process proceeds to step 340 in which each deformation component of is added to its respective original pattern f and/or g, resulting in a deformed pattern, such as may be represented by Eq. 3 noted above. It is to be appreciated that the deformation component is decoupled from the image f. As a result, a particular deformation field may be easily applied to other patterns to deform such other patterns in a corresponding way.

When both patterns have been deformed, each deformed pattern f and g has deformation coefficients a and b, respectively. The deformation coefficients a for the pattern f may be functionally related to the deformation coefficients b for the pattern g. For example, assuming that both patterns have identical displacement functions, it may be desirable to cause a to tend toward −b (e.g., a−b). As a result of such relationship between coefficients, the patterns will tend to deform toward each other. Additionally, the size of the optimization problem may be reduced and the allowable deformations may be further constrained by the relationship between deformation coefficients.

Next, the process proceeds to step 350 in which an expression for a simplified distance between the deformed patterns (e.g., an error image) is derived. The distance, which may be expressed as the difference between the two deformed patterns, is a linear system, such as set forth above with respect to Eq. 10. An indication of the distance between the patterns is derived by subtracting one pattern from the other.

From step 350, the process proceeds to step 360 in which deformation coefficients are computed by minimizing the cost associated with deforming the respective images. The cost minimization balances the error image (e.g., simple distance) of the patterns f and g with the associated deformation provided by the respective deformation coefficients.

As mentioned above, a cost function may capture correlations between different parts in the respective patterns f and g. The cost function, for example, may include a diagonal matrix whose non-zero elements contain variances of appropriate pixels. The cost function may operate to provide different pixels with different levels of importance so that more important aspects of a pattern may be weighted more heavily in the pattern recognition process. Another cost function, which varies as a function of the deformation coefficients a and b, may capture a covariant structure associated with the deformation coefficients of the allowed deformations to constrain the deformation of the images f and g. Yet another cost function, which varies as a function of the respective deformation components (derived at step 330), may further constrain the elastic deformation associated with each of the deformation coefficients a and b as applied to the patterns f and g. Each cost function may return a scalar quantity of the form $x^T M x$; where M is a matrix of values, x is a quantity to which the cost function is applied, and $^T$ denotes a transpose operation. As a result, after application of such cost functions, the aggregate expression provides an indication of the distance between the patterns f and g.

For example, the deformation coefficients may be computed by quadratic optimization by minimizing the cost of deformation between the patterns f and g with respect to the deformation coefficients a and b. Alternatively, the deformation coefficients may be solved by an iterative process, such as gradient descent. Those skilled in the will understand and appreciate that other methods also may be employed to derive the deformation coefficients in accordance with an aspect of the present invention.

After the deformation coefficients have been computed in step 360, the process proceeds to the connector A to compute a measure of similarity between the patterns f and g as shown in FIG. 6B. The methodology shown in FIG. 6B is similar to that shown and described with respect to steps 330–360 of FIG. 6A. Briefly stated, the process continues to step 400, in which a substantially smooth deformation field is applied to (e.g., multiplied with) the spatial derivative of the pattern(s). In accordance with an aspect of the present invention, the deformation field is a smooth and generally non-uniform field parameterized by functional basis vectors and the deformation coefficients determined at step 360. The functional basis vectors may be linear transformation matrices, such as, for example, wavelet basis vectors, Fourier type basis vectors, sin or cosine vectors, or other suitable basis vectors. The basis vectors are multiplied by the deformation coefficients, such as by employing an element-wise product function. The deformation field is, in turn applied to the derivative(s), previously determined at step 310 via an element-wise product function to provide a corresponding deformation component for each pattern being deformed. In accordance with an aspect of the present invention, both patterns f and g may or may not be deformed at step 400.

From step 400, the process proceeds to step 410 in which each deformation component of is added to its respective original pattern f and/or g, resulting in a deformed pattern (see, e.g., Eq. 3). When both patterns have been deformed, each deformed pattern f and g has respective coefficients a and b, which may be functionally related to each other.

Next, the process proceeds to step 420 to derive an indication of a distance between the patterns. The distance, which may be expressed as the difference between the two deformed patterns, is a linear system, such as set forth above with respect to Eq. 10. From step 420, the process proceeds to step 430 in which a cost of deformation among the patterns f and g is evaluated to determine the similarity between the patterns. At this stage, it is assumed that the parameters are known. For example, the measure of similarity may be referred to as an elastic distance between the patterns f and g, which may be evaluated by substituting values of the deformation coefficients a and b into the distance expression, such as set forth above with respect to Eq. 11 or Eq. 12. The cost of deformation may thus be evaluated to determine the likelihood of a match between the patterns f and g. The deformation cost function may be substantially identical to that described herein.

Figure 7:
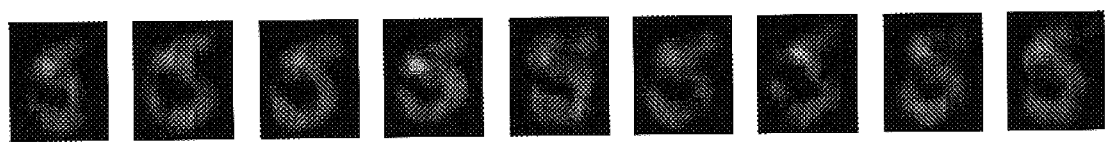
FIG. 7 is an example of a pattern that has been deformed by multiple deformation field in accordance with the present invention.

FIG. 7 illustrates several examples of a deformed image pattern resulting from application of eight randomly selected deformation fields to an image pattern in accordance with an aspect of the present invention. In particular, the deformation coefficients have been selected from a unit-covariance Gaussian to provide respective deformation fields that are substantially smooth. The resulting deformation fields, in turn, were applied to an image pattern of a digit.

Figure 8:
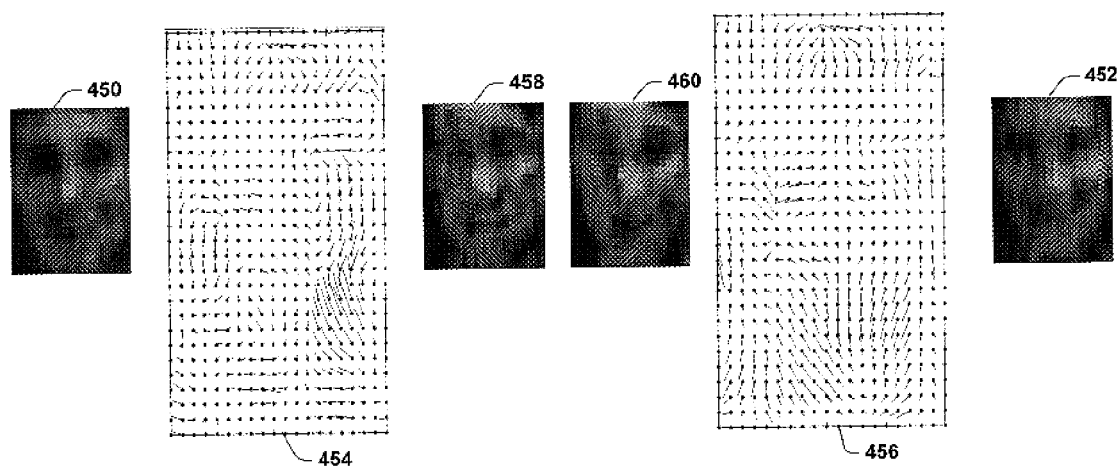
FIG. 8 is an example of two image patterns that have been deformably matched in accordance with the present invention.

FIG. 8 illustrates an example in which deformation fields have been estimated for matching two images 450 and 452 of a face of the same person but with different facial expressions. In this example, deformation fields 454 and 456 have been derived from application of the algorithm to the image patterns 400 and 402, respectively. The deformation fields 454 and 456 operate on the image patterns 450 and 452 to produce respective deformed images 458 and 460. In this case, the ? matrix has been set to identity and the matrix ? has been set by hand to allow a couple of pixels of deformations. As a result of applying the deformation fields 454 and 456, the image patterns 450 and 454 tend to deform toward each other, as shown by deformed images 458 and 460, so that a more accurate measure of similarity between the patterns may be determined, such as described herein. Those skilled in the art will understand and appreciate that, in accordance with teachings contained herein, other acceptable (or even better) deformation fields may be obtained, such as by minimizing the cost parameters associated with Eq. 11. The resulting deformation fields may, in turn, be employed to facilitate measuring similarity between patterns in accordance with an aspect of the present invention. What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" and variants thereof or the term "having" and variants thereof are used in either the detailed description or the claims, such terms are intended to be inclusive in a manner similar to the term "comprising."

What is claimed is:

1. A method to facilitate pattern recognition between a first pattern and a second pattern, comprising
    applying to spatial derivative of the first pattern a substantially smooth deformation field having deformation coefficients to deform the first pattern and form a deformation component of the first pattern, the substantially smooth deformation field for the first pattern further comprises a displacement component for each dimension of a space associated with the first pattern, the displacement component having associated deformation coefficients;
    aggregating the first pattern and the deformation component of the first pattern to define a first deformed pattern; and
    determining a minimum distance between the first deformed pattern and the second pattern relative to the deformation coefficients for the first pattern.

2. The method of claim 1 further comprising the step of applying a deformation cost function to the deformation coefficients for the first pattern to favor smooth deformation in the step of determining a minimum distance.

3. The method of claim 2, wherein the deformation coefficients are computed by minimizing the cost function.

4. The method of claim 1 further comprising applying a pattern cost factor to at least the first pattern to selectively weight different aspects of the first pattern in the step of determining a minimum distance.

5. The method of claim 1 further comprising applying a deformation component cost factor to penalize large deformations in the step of determining a minimum distance.

6. A computer-readable medium having computer-executable instructions for performing the steps of claim 1.

7. A method to facilitate pattern recognition between a first pattern and a second pattern, comprising:
    applying to the first pattern a substantially smooth deformation field having deformation coefficients to deform the first pattern and form a deformation component of the first pattern, the deformation field for the first pattern being parameterized by functional basis vectors and by the deformation coefficients for the first pattern,
    aggregating the first pattern and the deformation component of the first pattern to define a first deformed pattern;
    determining a minimum distance between the first deformed pattern and the second pattern relative to the deformation coefficients for the first pattern, and
    applying a second smooth deformation field to the second pattern to form a second deformation component that is added to the second pattern to define a second deformed pattern, the second deformation field being parameterized by functional basis vectors and deformation coefficients associated with the second pattern, the minimum distance being determined as a function of the first deformed pattern and the second deformed pattern.

8. The method of claim 7, wherein the deformation fields for each of the first and second patterns include wavelet basis vectors and respective deformation coefficients.

9. The method of claim 8, wherein the respective deformation coefficients for the first and second patterns have substantially opposite values.

10. A method to facilitate pattern recognition between a first pattern and a second pattern, comprising:
    applying to a spatial derivative of the first pattern a substantially smooth deformation field having deformation coefficients to deform the first pattern and form a first deformation component; the substantially smooth deformation field for the first pattern further comprises a displacement component for each dimension of a space associated with the first pattern, and the displacement component has associated deformation coefficients,
    adding the first deformation component and the first pattern to define a first deformed pattern;
    determining the deformation coefficients for the first pattern that minimize a distance between the first deformed pattern and the second pattern; and
    using the determined deformation coefficients to evaluate a distance between the first deformed pattern and the second pattern.

11. A method to facilitate pattern recognition between a first pattern and a second pattern, comprising:
    applying to a spatial derivative of the first pattern a substantially smooth deformation field having deformation coefficients to deform the first pattern and form a first deformation component, the substantially smooth deformation field for the first pattern is parameterized by functional basis vectors and by the deformation coefficients for the first pattern;
    adding the first deformation component and the first pattern to define a first deformed pattern;
    determining the deformation coefficients for the first pattern that minimize a distance between the first deformed pattern and the second pattern; and
    applying a second smooth deformation field to the second pattern to form a second deformation component that is added to the second pattern to define a second deformed pattern, the second deformation field being parameterized by functional basis vectors and deformation coefficients associated with the second pattern, the distance being determined between the first deformed pattern and the second deformed pattern relative the deformation coefficients for the first and second patterns.

12. The method of claim 11, wherein the deformation fields for each of the first and second patterns include wavelet basis vectors and respective deformation coefficients.

13. The method of claim 12, wherein the respective deformation coefficients for the first and second patterns have substantially opposite values.

14. The method of claim 12, further comprising determining the respective deformation coefficient by minimizing cost associated with deforming the first and second patterns.

15. A method to facilitate pattern recognition between a fit pattern and a second pattern, comprising
    applying to the first pattern a substantially smooth deformation field having deformation coefficients to deform the first pattern and form a first deformation component;
    adding the first deformation component and the first pattern to define a first deformed pattern;
    determining the deformation coefficients for the first pattern that minimize a distance between the first deformed pattern and the second pattern;
    using the determined deformation coefficients to evaluate a distance between the first deformed pattern and the second pattern; and
    applying a deformation cost function to the deformation coefficients for the first pattern to favor smooth deformation in the step of determining a minimum distance.

16. The method of claim 15 further comprising applying a deformation component cost factor to penalize large deformations in the step of determining a minimum distance.

17. A method to facilitate pattern recognition between a first pattern and a second pattern, comprising
    applying to the first pattern a substantially smooth deformation field having deformation coefficients to deform the first pattern and form a first deformation component;
    adding the first deformation component and the first pattern to define a first deformed pattern;
    determining the deformation coefficients for the first pattern that minimize a distance between the first deformed pattern and the second pattern;
    using the determined deformation coefficients to evaluate a distance between the first deformed pattern and the second pattern; and
    applying a pattern cost factor to at least the first pattern to selectively weight different aspects of the first pattern in the step of determining a minimum distance.

18. A computer-readable medium having computer-executable instructions for:
    applying to the first pattern a substantially smooth deformation field having deformation coefficients to deform the first pattern and form a first deformation component, the substantially smooth deformation field for the first pattern is parameterized by functional basis vectors and by the deformation coefficients for the first pattern,
    adding the first deformation component and the first pattern to define a first deformed pattern;
    determining the deformation coefficients for the first patterns that minimize a cost functionally related to a difference between the first deformed pattern and the second pattern,
    employing the determined deformation coefficients to evaluate the cost between the first deformed pattern and the second pattern; and
    applying a second smooth deformation field to the second pattern to form a second deformation component that is added to the second pattern to define a second deformed pattern, the second deformation field being parameterized by functional basis vectors and deformation coefficients associated with the second pattern, the respective deformation coefficients for the first and second patterns being determined by minimizing a cost functionally related to a difference between the first deformed pattern and the second deformed pattern.

19. A method to facilitate pattern recognition between a first pattern and a second pattern, comprising the steps of:
    applying to the first pattern a substantially smooth deformation field having first deformation coefficients to deform the first pattern and form a first deformation component;
    adding the first pattern and the first deformation component to define a first deformed pattern;
    applying to the second pattern a substantially smooth deformation field having second deformation coefficients to deform the second pattern and form a second deformation component;
    adding the second pattern and the second deformation component to define a second deformed pattern; and
    determining a minimum distance between the first deformed pattern and the second deformed pattern relative to the first and second deformation coefficients.

20. The method of claim 19, wherein the deformation fields for each of the first and second patterns include low frequency wavelet basis vectors and respective deformation coefficients.

21. The method of claim 19, wherein the respective deformation coefficients for the first and second patterns have substantially opposite values.

22. A computer-readable medium having computer-executable instructions for:
    applying to the first pattern a substantially smooth deformation field having first deformation coefficients to deform the first pattern and form a first deformation component;
    adding the first pattern and the first deformation component to define a first deformed pattern;
    applying to the second pattern a substantially smooth deformation field having second deformation coefficients to deform the second pattern and form a second deformation component;
    adding the second pattern and the second deformation component to define a second deformed pattern; and
    determining a minimum distance between the first deformed pattern and the second deformed pattern relative to the first and second deformation coefficients, whereby the determined minimum distance provides a measure of similarity between the first and second patterns.

23. A system to measure similarity between first and second patterns comprising:
    a first deformation system that applies a substantially smooth deformation field to deform the first pattern and provide a first deformation component, the deformation field having deformation coefficients, the deformation system applies the deformation field to a spatial derivative of the first pattern to derive the deformation component of the first pattern, the substantially smooth deformation field for the first pattern further comprises first and second vector components corresponding to respective first and second displacement components, each of the first and second vector components having associated deformation coefficients;

an aggregation system that aggregates the first deformation component and the first pattern to derive a first deformed pattern; and a minimization system that minimizes a distance between the first deformed pattern and the second pattern relative to the deformation coefficients.

24. The system of claim 23, the deformation system further applies a second substantially smooth deformation field to the second pattern to form a second deformation component, the deformation system adding the second deformation component to the second pattern to define a second deformed pattern, the second deformation field being parameterized by functional basis vectors and deformation coefficients associated with the second pattern, the minimization system determining a minimum distance as a function of the first deformed pattern and the second deformed pattern.

25. The system of claim 24, wherein the deformation fields for each of the first and second patterns include wavelet basis vectors and respective deformation coefficients.

26. The system of claim 25, wherein the respective deformation coefficients for the first and second patterns are determined to have substantially opposite values.

27. A system to measure similarity between first and second patterns, comprising:

a first deformation system for applying a substantially smooth deformation field to deform the first pattern and provide a first deformation component, the substantially smooth deformation field having deformation coefficients;

an aggregation system for aggregating the first deformation component and the first pattern to derive a first deformed pattern;

a minimization system for minimizing a distance between the first deformed pattern and the second pattern relative to the deformation coefficients, and a deformation cost function that imposes a cost functionally related to the deformation coefficients to selectively weight different parts of the deformed pattern.

28. The system of claim 27 further comprising a deformation cost function for constraining large elastic deformations.

29. The system of claim 27, the minimized distance comprises at least one cost function, the deformation coefficients being computed by minimizing the cost function.

30. A system to measure similarity between first and second patterns, comprising:

a first deformation system that applies a substantially smooth deformation field to deform the first pattern and provide a first deformation component, the substantially smooth deformation field having deformation coefficients;

an aggregation system that aggregates the first deformation component and the first pattern to derive a first deformed pattern;

a minimization system that minimizes a distance between the first deformed pattern and the second pattern relative to the deformation coefficients, and a pattern cost function to selectively weight different aspects of the first pattern.

* * * * *